June 9, 1925.
J. L. KILEY
COLLAPSIBLE RIM SECURING MEANS
Filed July 11. 1924
1,541,580
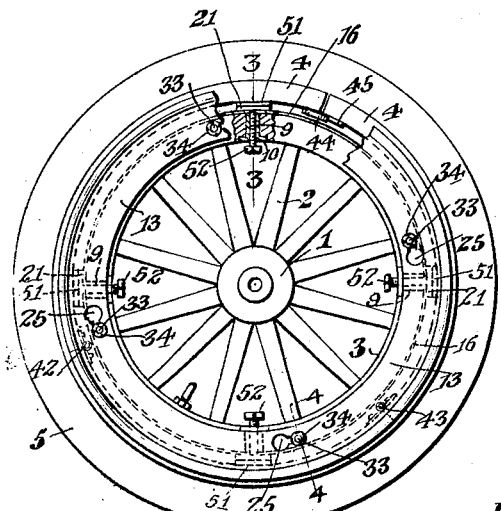
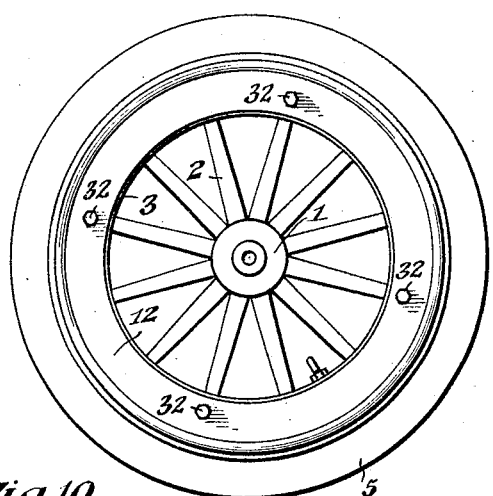
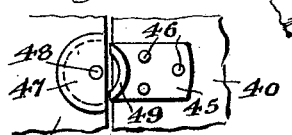
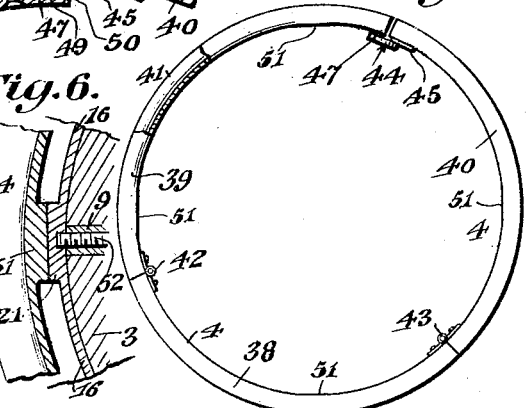
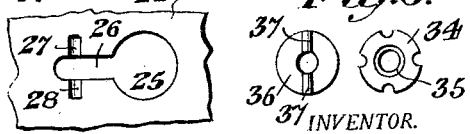
INVENTOR.
J. L. Kiley,
BY
Geo. S. Kimmel
ATTORNEY.

Patented June 9, 1925.

1,541,580

UNITED STATES PATENT OFFICE.

JOE LEON KILEY, OF TYLER, MISSOURI.

COLLAPSIBLE-RIM-SECURING MEANS.

Application filed July 11, 1924. Serial No. 725,431.

*To all whom it may concern:*

Be it known that I, JOE LEON KILEY, a citizen of the United States, residing at Tyler, in the county of Pemiscot and State of Missouri, have invented certain new and useful Improvements in Collapsible-Rim-Securing Means, of which the following is a specification.

This invention relates to a collapsible rim securing means and has for its object to provide, in a manner as hereinafter set forth, means for expeditiously securing and removing a collapsible rim from the felly of a wheel.
Further objects of the invention are to provide, in a manner as hereinafter set forth, a collapsible rim securing means, which is comparatively simple in its construction and arrangement, strong, durable thoroughly efficient and convenient in its use, and readily set up with respect to the felly of a wheel for securing a collapsible rim thereto.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation, broken away, of a collapsible rim securing means in accordance with this invention.
Figure 2 is a side elevation, looking towards the other side of a wheel, showing the adaptation therewith of a rim securing means in accordance with this invention.

Figure 3 is a section on line 3—3, Figure 1.

Figure 4 is a section on line 4—4, Figure 1.

Figure 5 is a side elevation of a collapsible rim extended.
Figure 6 is a section on line 6—6, Figure 3.

Figure 7 is a fragmentary view of one of the rim securing elements.

Figure 8 illustrates in front and rear elevation a locking washer.

Figure 9 is a fragmentary view illustrating a latching means for the sections of the collapsible rim.

Figure 10 is a fragmentary view, in longitudinal section, of the latching means for the rim section.

Referring to the drawings in detail, 1 denotes the hub, 2 the spokes and 3 the felly of a wheel upon which is adapted to be secured a collapsible rim 4, carrying a pneumatic tire 5.

The felly 3 is formed with a series of transversely extending spaced openings 6, preferably four in number, and arranged equi-distant with respect to each other. The inner side portion of the felly 3 is formed with sockets 7 of greater diameter than the openings 6. Each socket 7 is arranged at the outer end of an opening 6 and the latter communicates with a socket through the bottom thereof.

The felly 4 is furthermore provided with a series of radially extending openings 8, preferably four in number and arranged equi-distant with respect to each other. Mounted in each of the openings 8 is an interiorly threaded sleeve 9 having a flanged inner end 10, which is counter-sunk in the inner face of the felly 3. Hold-fast devices 11 extend through the flange 10 and engage in the felly 3 for fixedly securing the sleeve therewith. The outer end of the sleeve 9 is flush with the outer face of the felly 3. The openings 8 are arranged centrally with respect to the inner and outer sides of the felly 3.

Connected against each side of the felly 3, as well as projecting outwardly therefrom, is a rim securing element. One of these elements is generally referred to by the reference character 12 and the other by the reference character 13. The element 12, in cross section, is formed with a vertically extending outer portion 14, a flaring portion 15 which constitutes a flange, and an inner portion 16, which is arranged at rightangles with respect to the portion 14. The element 12 is circular in contour and is formed from sheet metal of the desired gage. The intermediate portion 15 consists of an outer flaring part 17 and an inner flaring part 18 connected together at their outer portions by a curved bend 19. The inner edge of the part 17 of the intermediate portion 15 merges into the outer edge of the portion 14, and the inner edge of the part 18 of the intermediate portion 15 merges into one side of the portion 16. The portion 16 is mounted against the outer face of the felly 3 and its width is the same as the width of the felly 3. The portion 14 is provided with spaced openings 20, and formed integral with each inner face of the portion 14, as well as registering with the opening 20 is a cylindrical interiorly threaded collar 21 seating in a socket 7. The element 12 is stationary.

The outer face of the portion 16 is provided with a series of wedge-shaped enlargements 21, constituting supports preferably four in number and arranged equi-distant from each other. Each of the enlargements extends transversely of the portion 16 and gradually decreases in height towards the inner part 18 of the intermediate portion 15. Each of the enlargements 21 extends to the inner part 18 of the intermediate portion 15.

The element 13 is circular in contour and comprises an inner portion 22 and an outer flaring portion 23. The element 13 is not only positioned against one side of the felly 3, but also against a side edge of the portion 16 of the element 12. The outer portion 23 of the element 13 constitutes a flange and is oppositely disposed with respect to the flange formed by the intermediate portion 15 of the element 12, and the said flanges are adapted to have mounted therebetween a collapsible rim referred to generally by the reference character 4.

The inner portion 22 of the element 13 is provided with a series of key-hole shaped slots, preferably four in number and arranged equi-distant with respect to each other. Each of said slots consists of an enlarged circular portion 25 and a semi-oval shaped portion 26 of materially less width than the diameter of the circular portion 25. The portion 26 projects from and opens into the portion 25, centrally thereof. The outer face of the element 13 from each side edge of the portion 26 of each of the slots, is grooved, as indicated at 27, 28 to provide a pair of seats for a purpose to be presently referred to.

A series of securing bolts is employed for permanently connecting the elements 12 and 13 to the felly 3, and said bolts extend through the openings 6. Each bolt consists of a cylindrical shank 29, having a threaded terminal 30, and its opposite terminal merging into a circular peripherally threaded enlargement 31, having a polygonal-shaped head 32 formed integral therewith. When the bolts are mounted in connecting position, the enlargements 31 have threaded engagement with the collars 21′, and the heads 32 abut against the outer face of the element 12. The shanks 29 extend through the slots in the element 13. The bolts, when mounted in position, first extend through the enlarged portions 25 of the slots and then the element 13 is shifted to a position whereby the shanks 29 will extend through the reduced portions 26 of the slots.

The bolts are permanently connected in position through the medium of a head 33, at the threaded terminal 30 of each shank 29, a securing nut 34 mounted on the threaded terminal 30 and having a counter-sunk portion 35, and a locking washer 36 formed with protuberances 37, which engage in the grooves 27 and 28. Each bolt projects slightly from a nut 34 to permit of the releasing of the locking washer 36 by moving the nut 34 toward the head 33 so that the protuberances 37 will be clear of the grooves 27 and 28, under such conditions permitting of the element 13 being shifted to released position.

The collapsible rim comprises a series of sections 38, 39 and 40 and said rim 4, in cross section, is of the flange type, and when the rim is mounted in position the flanges 41 thereof are seated against the intermediate portion 15 of the element 12 and against the outer portion 23 of the element 13. The sections 38, 39 are hinged together, as at 42, and the sections 38 and 40 are hinged together as at 43. The sections 39 and 40 are detachably connected together by a latching device, referred to generally by the reference character 44, which consists of a flanged plate 45, fixedly secured by the hold-fast devices 46 to the inner face of the section 40, at the free end thereof, and a shiftable flanged plate 47 pivotally connected, as at 48 to the inner face of the section 39, at the free end thereof. The flange on the plate 45 is indicated at 49, and the flange on the plate 47 is indicated at 50. The flange 49, as well as the flange 50, is semi-circular in contour, and the flange 50 is adapted to engage one face of the flange 49, see Figure 10, for the purpose of detachably connecting together the sections 39 and 40.

The inner face of the rim 4 is provided with a series of enlargements constituting supports and arranged equi-distant with respect to each other, as well as extending transversely of the inner face of the rim 4. The enlargements are indicated at 51 and each of which inclines from one end towards the other. The enlargements 51 are similar in construction to the enlargements 21 but oppositely disposed with respect to these latter, and the said enlargements 21 and 51 act as a wedging means for supporting the rim 4, when mounted to surround the inner portion 16 of the element 12, or when the rim 4 is positioned between the flanges formed by an intermediate portion of the element 12 and the outer portion of the element 13. After the rim is mounted to surround the portion 16, it is then given a slight rotary movement to seat the wedge-shaped enlargements 51 on the enlargements 21.

Threadedly engaging with each of the sleeves 9 is a bolt 52, which extends into the inner portion 16 of the element 12 to prevent circumferential movement of said portion 16.

Owing to the manner of setting up the element 13, it can be quickly shifted for the purpose of releasing the rim 4, so that the latter can be quickly removed and collapsed for the purpose of disconnecting the tire therefrom.

It is thought that the many advantages of a collapsible rim securing means, in accordance with this invention, can be readily understood, but although the preferred embodiment of the invention is as illustrated and described, yet changes in the details of construction can be had which will fall within the scope of the invention as claimed.

What I claim is:—

1. A demountable rim securing means comprising a stationary one-piece rim securing element having portions thereof extending at right angles with respect to each other and adapted to be positioned against the inner side and against the outer face of a felly and further including an intermediate portion connecting said angularly disposed portions together and constituting a rim abutting and attaching means projecting from the inner side of the felly, a shiftable rim securing element adapted to be positioned against the other side of the felly and having an outer projecting portion constituting a rim attaching means and opposing the rim attaching means on the stationary element, and retaining means common to said elements for fixedly securing the stationary element and releasably connecting the shiftable element to the felly of the wheel, said shiftable element and felly having coacting parts to permit of the shifting of said element against one side of the felly when connected thereto, said rim attaching means engaging with the flanges of the rim for securing the latter in position.

2. A demountable rim securing means comprising a stationary one-piece rim securing element having portions thereof extending at right angles with respect to each other and adapted to be positioned against the inner side and against the outer face of a felly and further including an intermediate portion formed of a pair of curved overlapping parts each extended outwardly from one of said angular portions and providing means for connecting said angularly disposed portions together, said intermediate portion further constituting a rim abutting and attaching means projecting from the inner side of the felly, a shiftable rim securing element adapted to be positioned against the other side of the felly and having an outer projecting portion constituting a rim attaching means and opposing the rim attaching means on the stationary element, and retaining means common to said elements for fixedly securing the stationary element and releasably connecting the shiftable element to the felly of the wheel, said shiftable element and felly having coacting parts to permit of the shifting of said element against one side of the felly when connected thereto, said rim attaching means engaging with the flanges of the rim for securing the latter in position, that part of said stationary element seated upon the outer face of the felly provided with a plurality of integral wedge-shaped supporting enlargements for the rim when the latter is secured in position by the rim attaching means.

In testimony whereof, I affix my signature hereto.

JOE LEON KILEY.